United States Patent [19]

Tiesler

[11] Patent Number: 4,629,244
[45] Date of Patent: Dec. 16, 1986

[54] HINGE ASSEMBLY

[75] Inventor: Roy F. Tiesler, Troy, Mich.

[73] Assignee: General Motors Corporation, Detroit, Mich.

[21] Appl. No.: 797,161

[22] Filed: Nov. 12, 1985

[51] Int. Cl.⁴ ............................................... B60J 1/18
[52] U.S. Cl. .................................... 296/146; 296/202
[58] Field of Search ................ 296/146, 50, 195, 202; 16/71, 82

[56] References Cited

U.S. PATENT DOCUMENTS

| | | | |
|---|---|---|---|
| 2,870,477 | 1/1959 | Anthony et al. | 16/82 |
| 3,558,184 | 1/1971 | Plegat | 296/146 |
| 4,159,141 | 6/1979 | Direk | 296/146 |

Primary Examiner—Robert R. Song
Attorney, Agent, or Firm—Patrick M. Griffin

[57] ABSTRACT

An improved hinge assembly for a vehicle, such as a van having a rear door and a tail light. The hinge assembly mounts the door to the vehicle, and in addition, is hidden from view from outside the vehicle, but for edge surfaces of a pair of movable hinge members that are located within spaced gaps to either side of the tail light. The edge surfaces thereby appear to border the tail light, providing an enhanced aesthetic appearance. In addition, the movable hinge members move out through the spaced gaps, which open both sidewise and rearwardly of the vehicle body, when the door opens. Consequently, the door can open wide, outboard of the side of the vehicle.

3 Claims, 3 Drawing Figures

HINGE ASSEMBLY

This application refers to hinge assemblies in general, and specifically to an improved hinge assembly that mounts a door to a vehicle as well as cooperatively providing an enhanced aesthetic appearance to the exterior of the vehicle.

BACKGROUND OF THE INVENTION

Automotive vehicles, especially vans, generally have a pivotally mounted rear door with an outer surface that is flush, when the door is closed, with an adjacent outer surface of the vehicle body. Vans also generally include a tail light mounted to the body that has an outer surface that is also flush with the vehicle body outer surface and with the outer surface of the door, when it is closed. Typically, the door hinges in vans of this type are simple, single pivot hinges mounted to the exterior of the body and doors, thereby allowing the doors to be opened widely, outboard of the side of the vehicle. Wide door opening allows easier loading, since the van may be backed up to a loading dock or similar structure. Exterior hinges, of course, are exposed to view, and are painted the same color as the vehicle in order not to detract from its aesthetic appearance. Interior hinges for vans are known, and an example is disclosed in the U.S. Pat. No. 2,870,477 to Anthony et al., assigned to the assignee of the present invention. The hinges there are fairly complex double pivot hinges, in order to allow wide opening of the rear doors. Although hidden, such hinges do nothing to enhance the aesthetic appearance of the vehicle.

SUMMARY OF THE INVENTION

The subject invention provides an improved hinge assembly for an automotive vehicle of the type described above that provides an enhanced aesthetic appearance to the vehicle in cooperation with the vehicle body, the door, and a separate panel, such as a tail light, mounted to the vehicle body.

The improved hinge assembly of the invention is used in an automotive vehicle, such as a van. The vehicle has a body and a door pivotally mounted to the body by the hinge assembly of the invention so as to be opened and closed relative to the body. The body and door have adjacent outer surfaces that are substantially flush when the door is closed. In the preferred embodiment, the vehicle body has both a side and an integral rear outer surface, with a recess at the juncture of the side and rear outer surfaces. A separate panel, such as a tail light, also has an outer surface, as well as a pair of spaced sides. The tail light is mounted to the body within the recess and located so that the tail light outer surface is substantially flush with the adjacent outer surface of the door, when the door is closed. The outer surface of the tail light is also substantially flush with the body side and rear surfaces. The tail light is also located within the recess so that its spaced sides define a pair of spaced gaps with the flush body side, rear and door outer surfaces. These spaced gaps open both sidewise and rearwardly of the vehicle body, because they are defined both in the side and rear outer surfaces of the body.

The improved hinge assembly of the invention includes a pair of stationary hinge members, which are hinge straps adapted to be secured to the body so as to be hidden from view by the body outer surface. The hinge assembly also includes a pair of movable hinge members. The movable hinge members are also hinge straps, each of which has an an attachment portion secured to the door and hidden from view by the tail light outer surface when the door is closed. Each of the movable hinge straps also has a pivot support in the form of a plate located proximate to a respective side of the tail light, and pivotally joined to one of the stationary hinge straps. The door is thereby mounted to the body. By virtue of their location, the pivot support plates may move out through the spaced gaps as the door opens. Since the gaps open sidewise, as well as rearwardly, of the vehicle, the door may be opened wide, outboard of the side of the vehicle, and the pivot support plate of the movable hinge strap will clear the vehicle body. Furthermore, because of their location, only an outer edge appearance surface of each of the pivot support plates is visible within its respective spaced gap, when the door is closed. These visible outer edge surfaces are sufficiently flush with the flush outer surfaces of the tail light, the body, and the door so as to appear to border the sides of the tail light, much as would a decorative strip bordering the tail light. Therefore, the visible outer edge surfaces, which are part of a functional hinge assembly, also cooperate with the tail light, body, and door outer surfaces to give an enhanced aesthetic appearance to the vehicle.

It is, therefore, an object of the invention to provide an improved hinge assembly for an automotive vehicle, a vehicle that has a body and a door pivotally mounted thereto so as to be opened and closed relative to the body, with the body and door having adjacent outer surfaces that are substantially flush when the door is closed, and that also has a separate panel with an outer surface and a side, with the panel being mounted to the body and located so that the outer surface of the panel is substantially flush with the flush body and door outer surfaces and also located so that the side of the panel defines gap with the flush body and door outer surfaces, the improved hinge assembly having a stationary hinge member adapted to be secured to the body so as to be hidden from view by the body outer surface, and also having a movable hinge member which has an attachment portion adapted to be secured to the door so as to be hidden from view by the panel outer surface when the door is closed and also having a pivot support pivotally joined to the stationary hinge member, thereby mounting the door to the body, and with the pivot support being in the form of a plate located proximate to the side of the panel with only an outer edge appearance surface of the pivot support plate visible within the the gap, with the outer edge surface further being sufficiently flush with the flush panel, body and door outer surfaces so as to appear to border the side of the panel, thereby providing, in cooperation with the panel, body, and door outer surfaces, an enhanced aesthetic appearance.

It is yet another object of the invention to provide a vehicle that has a door mounted to the vehicle body by an improved hinge assembly of the type described, with the vehicle body having side and rear outer surfaces, the body rear outer surface being flush with the adjacent door outer surface when the door is closed, the vehicle also having a body mounted tail lamp with an outer surface and a pair of spaced sides, with the tail lamp being located so that the tail lamp outer surface is substantially flush with the body side and rear outer surfaces and is also substantially flush with the adjacent door outer surface when the door is closed, and with the tail lamp also being located so that the tail lamp sides define a pair of spaced gaps with the body side outer surface, and also with the flush body rear and door outer surfaces, the spaced gaps thereby opening both sidewise and rearwardly of the vehicle body, whereby a pair of pivot support plates, each of which is located proximate a respective side of the tail lamp, can move out through the rearwardly and sidewise opening spaced gaps as the door is opened, thereby allowing the door to be opened outboard of the body outer side surface, while the substantially flush outer edge appearance surfaces of the pivot support plates, which are visible in the spaced gaps, appear to border the sides of the tail lamp, thereby providing, in cooperation with the tail lamp, body, and door outer surfaces, an enhanced aesthetic appearance.

DESCRIPTION OF THE PREFERRED EMBODIMENT

These and other objects and advantages of the invention will appear from the following written description and drawings, in which.

Figure 1:
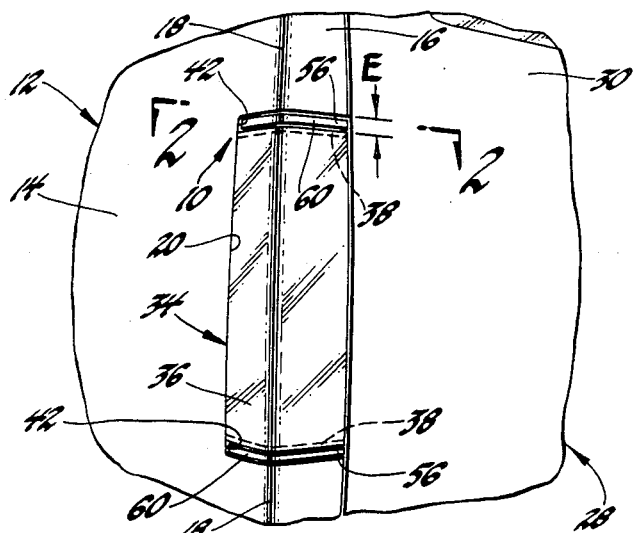
FIG. 1 is a view of the portion of a van type automotive vehicle having a door mounted to the vehicle body by the improved hinge assembly of the invention.
Figure 2:
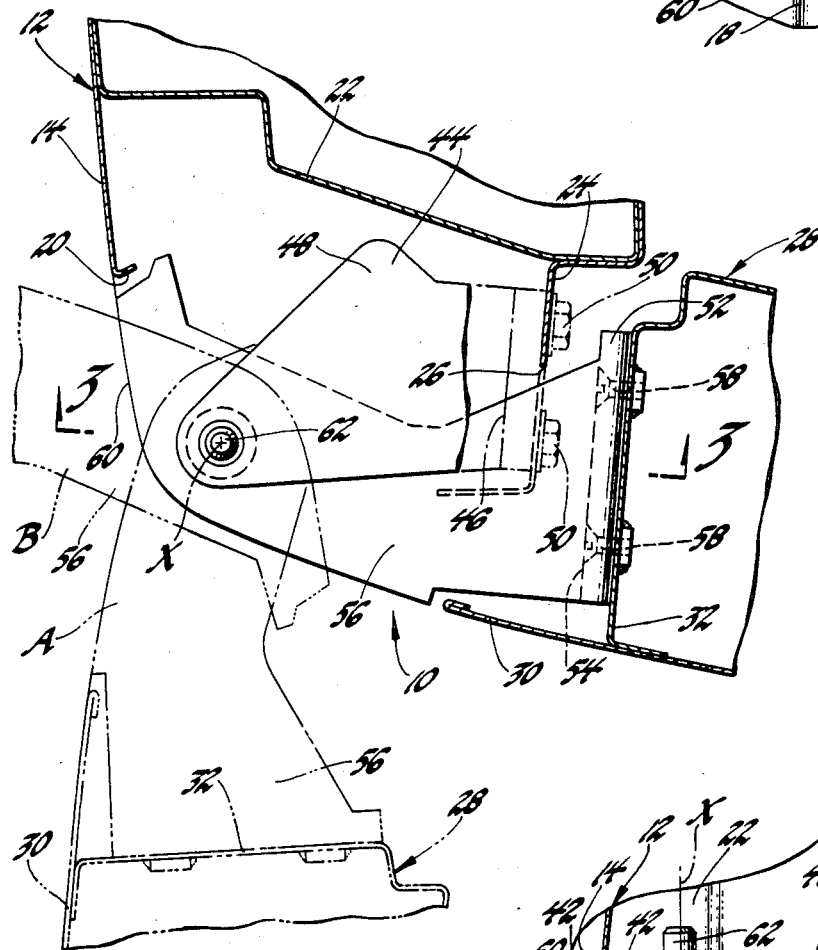
FIG. 2 is an enlarged sectional view taken along the line 2—2 of FIG. 1, showing the position of the hinge assembly, when the door is closed, in solid lines, and showing two positions of the hinge assembly, when the door is in two different open positions, in dotted lines.
Figure 3:
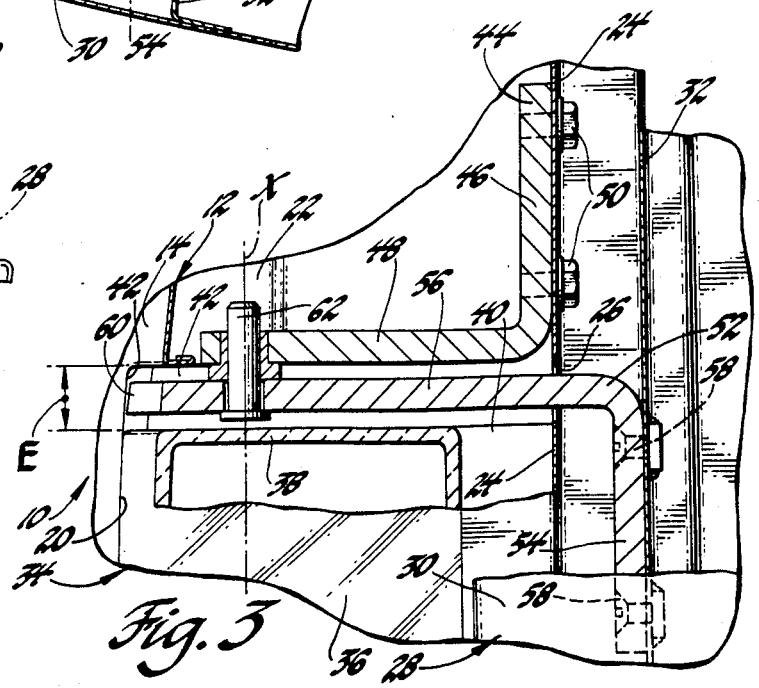
FIG. 3 is a sectional view taken along the line 3—3 of FIG. 2.

Referring first to FIGS. 1 through 3, the preferred embodiment of the improved hinge assembly of the invention is designated generally at 10. The hinge assembly 10 is disclosed for use in an automotive vehicle, such as a van, that has a body designated generally at 12. The vehicle body 12 has a side outer surface 14 and an integral rear outer surface 16 which join at a corner 18. The vehicle body 12 also has a recess 20 at the corner 18. Behind the recess 20, the body 12 is strengthened by a quarter panel 22, and a mounting flange 24 is welded to quarter panel 22. The body mounting flange 24 includes slots 26 at two locations, one of which is best visible in FIG. 3, for a reason discussed below. A rear door, designated generally at 28, has an outer surface 30 and a mounting flange 32. Door 28 is pivotally mounted to the body 12 by the hinge assembly 10, as described further below, so as to swing open from a closed position, shown in solid lines in FIG. 2. Two of the positions that the hinge assembly 10 assumes as door 28 opens are shown in dotted lines at A and B. The body rear outer surface 16 and door outer surface 30 are adjacent and substantially flush when the door 28 is closed, as best seen in FIG. 1.

Referring still to FIGS. 1 through 3, a separate panel, such as a tail light designated generally at 34, is sized and shaped so as to fit with clearance within the recess 20. Tail light 34 has an outer surface 36, a pair of spaced sides 38 and an inner portion 40, generally known as a close-out. The tail light 34 is mounted to the body 12 within the recess 20 by securing the close-out 40 to the body mounting flange 24 by suitable fasteners, not shown. The tail light 34 would actually be secured after mounting the door 28, as described below. Securing the tail light 34 to the body mounting flange 24 locates it so that the tail light outer surface 36 is substantially flush with the adjacent door outer surface 30 when the door 28 is closed. The tail light outer surface 36 is also substantially flush with the body side and rear outer surfaces 14 and 16. Securing the tail light 34 to the body mounting flange 24 also locates it so that its spaced sides 38 define a pair of spaced gaps 42 with the body side and rear outer surfaces 14 and 16, and also with the flush adjacent door outer surface 30. These spaced gaps 42, since they are defined both in the side and the rear outer surfaces 14 and 16, open both sidewise and rearwardly of the vehicle body 12. The gaps 42 may each be thought of as defining an envelope, one of which is shown in dotted lines in FIGS. 1 and 3 and designated at E. The envelope E indicates the space within which one could see straight into the gap 42 from the exterior of the vehicle body 12.

Still referring to FIGS. 1 through 3, the improved hinge assembly of the invention includes a pair of stationary hinge members designated generally at 44, one of which is visible in FIGS. 2 and 3. Each stationary hinge member 44 is a generally L-shaped hinge strap including first and second legs 46 and 48, with first leg 46 being adapted to receive suitable threaded fasteners 50. The hinge assembly 10 also includes a pair of movable hinge members designated generally at 52, one of which is visible in FIGS. 2 and 3. Each movable hinge member 52 is also a generally L-shaped hinge strap having first and second legs 54 and 56, with first leg 54 being adapted to receive suitable threaded fasteners 58. The second leg 56 of the movable hinge member 52 is longer than the second leg 48 of the stationary hinge member 44, and has the form of a plate with an outer edge surface 60. The outer edge surface 60 is polished and is contoured to have the same shape as one of the spaced gaps 42, though of less thickness, for a purpose described below. The two second legs 56 and 48 serve as pivot supports for a pivot pin 62 that pivotally joins each of the stationary hinge members 44 to a movable hinge member 52. The pivot pins 62 thereby form a pair of hinges, which are separable from the vehicle body 12, although they are illustrated only after being secured to the vehicle body 12. The operation of the hinge members 44 and 52, as well as their designations as stationary and movable, may be best understood after describing how they are secured.

Still referring to FIGS. 1 through 3, the first legs 46 of each hinge member 44 are secured to the body mounting flange 24 in the illustrated position with the threaded fasteners 50. So securing the hinge members 44 renders them stationary, and also locates them so as to be out of the envelope E, hidden from view by the body side and rear outer surfaces 14 and 16. Furthermore, the pivot support plate provided by each second leg 56 of the hinge members 52 is located so that it will be proximate to a respective tail light side 38. One second leg 56 will be above and one below the tail light 34, when the tail light 34 is secured as described above. Each outer edge surface 60 is thereby located within the envelope E. Next, the door 28 is held in place, and the first legs 54 of each hinge member 52 are secured to the door mounting flange 32 in the illustrated position by the threaded fasteners 58. The door 28 is thereby mounted to the vehicle body 12 so as to be opened and closed as described above, and the hinge members 52 move with the door 28. The tail light 34 is then secured to the vehicle body 12 in the location described above. Therefore, when the door 28 is closed, the second legs 56 of the movable hinge members 52 will rest in the slots 26, and the first legs 54 will be hidden from view by the tail light outer surface 36. A pivot axis for the door 28, labeled X in FIGS. 2 and 3, is provided by the two pivot pins 62. As best seen in FIG. 2, the pivot axis is located proximate the corner 18 juncture of the side and rear outer body surfaces 14 and 16. The separation of the pivot pins 62, one of which is located above and one below the tail light 34, is sufficient to provide good support to the door 28. Besides mounting the door per se, the hinge assembly 10 provides two important advantages, described next.

Still referring to FIGS. 1 through 3, the location of the movable hinge member second legs 56, as described above, assures that, when the door is closed, each outer edge appearance surface 60 will be visible within a respective spaced gap 42. Furthermore, each outer edge appearance surface 60 will be substantially flush with the the tail light outer surface 36, with the body side and rear outer surfaces 14 and 16, and also with the adjacent door outer surface 30. The visible outer edge appearance surfaces 60 are therefore sufficiently flush so as to appear to border the tail light 34, both above and below, much as would a separate decorative chrome strip. So, the functional hinge assembly 10 cooperates with the tail lamp 34, with the body side and rear outer surfaces 14 and 16, and with the door outer surface 30, to provide an enhanced aesthetic appearance. Furthermore, the door 28 is advantageously mounted. By virtue of their location, and the fact that they are less thick than the width of the spaced gaps 42, the second legs 56 of the movable hinge members 52 may each move about the pivot axis within an envelope E. In the open position A of FIG. 2, the second leg 56 has moved out through that portion of its respective spaced gap 42 that opens rearwardly of the vehicle body 12, and the door 28 is about ninety degrees open. In the open position B the second leg 56 has moved out through that portion of its respective spaced gap 42 that opens sidewise of the vehicle body 12, thereby clearing the vehicle body 12. Consequently, the door 28 may be opened one hundred and eighty degrees wide, outboard of the side outer surface 14 of the vehicle body 12. Therefore, the wide door opening of a complex double pivot hinge is had, but with the additional aesthetic advantage already described.

Variations of the preferred embodiment of the improved hinge assembly 10 may be made within the spirit of the invention. The stationary hinge members 44, as well as the movable hinge members 52, are both disclosed as generally L-shaped straps. This gives a real advantage, because it provides for a pair of easily handled, separable hinges made up of the pivotally joined hinge members 44 and 52, as described. It is important that the movable hinge member 52 have a pivot support in the form of a plate provided by its second leg 56, so that it can appear and move as described. The stationary hinge member 44, however, could be in another form, so long as it was secured to the vehicle body 12 and located so as to be hidden from view, as described. Furthermore, the wide opening of the vehicle door 28 might not be necessary in some circumstances, as with a side door, or with a rear door that swung up or down, rather than to the side. In such a case, the vehicle body 12 need not have a sidewise opening pair of spaced gaps 42. However, the visible outer edge appearance surfaces 60 could still provide the appearance of a border to the tail light 34 or other separate panel, even with spaced gaps 42 that opened in only one direction relative to the vehicle body 12. Therefore, it will be understood that the invention is not intended to be limited to the exact embodiment disclosed.

The embodiments of the invention in which an exclusive property or privilege is claimed are defined as follows:

1. An improved hinge assembly for an automotive vehicle having a body and a door pivotally mounted thereto so as to be opened and closed relative to said body, with said body and door having adjacent outer surfaces that are substantially flush when said door is closed, and a separate panel having an outer surface and side, said separate panel being mounted to said body and located so that said panel outer surface is substantially flush with said flush body and door outer surfaces and so that said panel side defines a spaced gap with said flush body and door outer surfaces, said improved hinge assembly serving to mount said door to said body as well as cooperatively providing an enhanced aesthetic appearance to said panel, body, and door outer surfaces, said hinge assembly comprising, in combination with said panel, a stationary hinge member adapted to be secured to said body so as to hidden from view by said body outer surface, a movable hinge member, said movable hinge member having an attachment portion adapted to be secured to said door so as to be hidden from view by said panel outer surface when said door is closed and pivot support pivotally joined to said stationary hinge member and adapted thereby to mount said door to said body, said pivot support being in the form of a plate located proximate to the side of said panel, with only an outer edge appearance surface of said pivot support plate being visible alongside said panel within said gap, said outer edge appearance surface further being sufficiently flush with said flush panel, body and door outer surfaces so as to appear to border the sides of said panel, thereby providing, in cooperation with said panel, body, and door outer surfaces, an enhanced aesthetic appearance.

2. An improved hinge assembly for an automotive vehicle having a body and a door pivotally mounted thereto so as to be opened and closed relative to said body, with said body and door having adjacent outer surfaces that are substantially flush when said door is closed, and a separate panel having an outer surface and a pair of spaced sides, said separate panel being mounted to said body and located so that said panel outer surface is substantially flush with said flush body and door outer surfaces and so that said panel spaced sides define a pair of spaced gaps with said flush body and door outer surfaces said improved hinge assembly serving to mount said door to said body as well as cooperatively providing an enhanced aesthetic appearance to said panel, body, and door outer surfaces, said hinge assembly comprising, a pair of stationary hinge members adapted to be secured to said body so as to hidden from view by said body outer surface, a pair of movable hinge members, said movable hinge members each having an attachment portion adapted to be secured to said door so as to be hidden from view by said panel outer surface when said door is closed, each of said movable hinge members also having a pivot support pivotally joined to one of said stationary hinge members and adapted thereby to mount said door to said body, each of said pivot supports being in the form of a plate located proximate to a respective side of said panel, with only an outer edge appearance surface of each of said pivot support plates being visible within a respective one of said spaced gaps, said outer edge appearance surfaces further being sufficiently flush with said flush panel, body and door outer surfaces so as to appear to border the sides of said panel, thereby providing, in cooperation with said panel, body, and door outer surfaces, an enhanced aesthetic appearance.

3. In an automotive vehicle having a body with side and rear outer surfaces and a door pivotally mounted to said body so as to be opened and closed relative to said body, said door having an outer surface adjacent to and substantially flush with said body rear outer surface when said door is closed, and a tail lamp having an outer surface and a pair of spaced sides, said tail lamp being mounted to said body and located so that said tail lamp outer surface is substantially flush with said body side and rear outer surfaces and is also substantially flush with said adjacent door outer surface when said door is closed, said tail lamp also being located so that its spaced sides define a pair of spaced gaps with said body side outer surface and also with said flush body rear and door outer surfaces, said spaced gaps thereby opening both sidewise and rearwardly of said vehicle body, an improved hinge assembly serving to mount said door to said body so that said door may be opened outboard of said body side outer surface, said hinge also cooperatively providing an enhanced aesthetic appearance to said tail lamp, body, and door outer surfaces, comprising, a pair of stationary hinge members secured to said body so as to hidden from view by said body side and rear outer surfaces, a pair of movable hinge members, said movable hinge members each having an attachment portion secured to said door so as to be hidden from view by said tail lamp outer surface when said door is closed, each of said movable hinge members also having a pivot support pivotally joined to one of said stationary hinge members and adapted thereby to mount said door to said body, each of said pivot supports being in the form of a plate located proximate to a respective tail lamp side, said location of said pivot support plates allowing said pivot supports to move out through said rearwardly and sidewise opening spaced gaps as said door is opened, thereby allowing said door to be opened outboard of said body outer side surface, said pivot supports each further having only an outer edge appearance surface visible within a respective one of said spaced gaps, said outer edge appearance surfaces further being sufficiently flush with said flush tail lamp, panel, body and door outer surfaces so as to appear to border the sides of said tail lamp, thereby providing, in cooperation with said tail lamp, body, and door outer surfaces, an enhanced aesthetic appearance.

* * * * *